United States Patent
Nawy et al.

(10) Patent No.: US 10,591,944 B2
(45) Date of Patent: Mar. 17, 2020

(54) OPEN AUTOMATED DEMAND RESPONSE (OPENADR) SERVER

(71) Applicant: IPKeys Technologies LLC, Eatontown, NJ (US)

(72) Inventors: Robert Nawy, Lincroft, NJ (US); Jim Boch, Stafford, VA (US); Robert Womack, Acworth, GA (US)

(73) Assignee: IPKEYS POWER PARTNERS LLC, Eatontown, NJ (US)

( * ) Notice: Subject to any disclaimer, the term of this patent is extended or adjusted under 35 U.S.C. 154(b) by 209 days.

(21) Appl. No.: 14/956,967

(22) Filed: Dec. 2, 2015

(65) Prior Publication Data

US 2016/0161965 A1    Jun. 9, 2016

Related U.S. Application Data

(60) Provisional application No. 62/086,888, filed on Dec. 3, 2014.

(51) Int. Cl.

| | |
|---|---|
| *G05F 1/66* | (2006.01) |
| *G05B 15/02* | (2006.01) |
| *G06Q 30/04* | (2012.01) |
| *G06Q 10/06* | (2012.01) |
| *G06Q 30/02* | (2012.01) |

(52) U.S. Cl.
CPC ............... *G05F 1/66* (2013.01); *G05B 15/02* (2013.01); *G06Q 10/06312* (2013.01); *G06Q 30/0206* (2013.01); *G06Q 30/04* (2013.01); *Y04S 10/54* (2013.01)

(58) Field of Classification Search
None
See application file for complete search history.

(56) References Cited

U.S. PATENT DOCUMENTS

| | | |
|---|---|---|
| 5,924,486 A | 7/1999 | Ehlers et al. |
| 6,633,823 B2 | 10/2003 | Bartone et al. |
| 7,135,956 B2 | 11/2006 | Bartone et al. |
| 7,949,615 B2 | 5/2011 | Ehlers et al. |

(Continued)

OTHER PUBLICATIONS

International Search Report of PCT Application No. PCT/US2015/63408, 3 pages, dated Feb. 12, 2016.

(Continued)

*Primary Examiner* — Bernard G Lindsay
*Assistant Examiner* — Saad M Kabir
(74) *Attorney, Agent, or Firm* — Lowenstein Sandler LLP (57) ABSTRACT

A first Open Automatic Demand Response (OpenADR)-compliant server may receive from a second OpenADR 2.0-compliant server, an OpenADR 2.0-compliant virtual end node (VEN), or building energy management system, a first message that represents an OpenADR-conformant message. The first message may include an energy price associated with one or more energy consuming or producing devices. The first OpenADR-compliant server may provide one or more instructions to an endpoint device operable to control the one or more energy consuming or producing devices. Responsive to the first OpenADR-compliant server determining the energy price exceeds a first threshold, the first OpenADR-compliant server may transmit the one or more instructions to the endpoint device to cause the one or more energy consuming or producing devices to reduce operations in response to determining that the energy price exceeds the first threshold.

16 Claims, 7 Drawing Sheets

(56) References Cited

U.S. PATENT DOCUMENTS

| | | |
|---|---|---|
| 8,311,863 B1 | 11/2012 | Kemp |
| 9,063,525 B2 | 6/2015 | Sanders et al. |
| 9,146,548 B2 | 9/2015 | Chambers et al. |
| 9,369,305 B1 | 6/2016 | Nawy et al. |
| 9,471,946 B1 | 10/2016 | Keil et al. |
| 2013/0166081 A1 | 6/2013 | Sanders et al. |
| 2013/0218355 A1 | 8/2013 | Lazaris |
| 2014/0067150 A1 | 3/2014 | Songkakul |
| 2014/0249680 A1 | 9/2014 | Wenzel |
| 2014/0277795 A1 | 9/2014 | Matsuoka et al. |
| 2014/0365164 A1 | 12/2014 | Fish et al. |
| 2015/0155745 A1 | 6/2015 | Schister et al. |

OTHER PUBLICATIONS

"OpenADR 2.0 Demand Response Program Implementation Guide," OpenADR Alliance, Revision No. 1.1, Document No. 20140701, 2016, 103 pages.

OPEN AUTOMATED DEMAND RESPONSE (OPENADR) SERVER

CROSS-REFERENCE TO RELATED APPLICATIONS

This application claims the benefit of U.S. provisional patent application No. 62/086,888 filed Dec. 3, 2014, the disclosure of which is incorporated herein by reference in its entirety.

TECHNICAL FIELD

The present disclosure relates generally to a system and a method involving Open Automated Demand Response (OpenADR) communications, and more particularly, to an OpenADR server and a method of operating the OpenADR server.

BACKGROUND

Demand Response (DR) is an established methodology for managing peak electrical demand by providing incentives to customers to reduce load on demand. An example of DR is a set of actions taken to reduce load when electric grid contingencies threaten supply-demand balance or market conditions occur that raise electricity costs.

DR plays a vital role in energy grid stabilization (for example during hot summers), easing severely-constrained electrical grids. Future energy crises caused by electricity demand exceeding system capacity may be postponed or even averted through DR. Automated Demand Response (ADR) is a systematic technology and communications platform that helps system operators reduce the operating costs of DR programs while improving DR resource reliability and consistency.

Open Automated Demand Response (OpenADR) is an open and standardized methodology for energy providers and system operators to communicate and convey energy market signals and DR signals with each other, and with their customers, using a common language. A typical use of OpenADR includes transmitting information and signals that cause electrical power-using devices to be turned off during periods of high demand. OpenADR information may be transmitted from electricity providers and system operators to the customers via Transmission Control Protocol (TCP) and Internet Protocol (IP), commonly known as TCP/IP. TCP/IP is a set of communications protocols used for the Internet and similar networks. OpenADR information may be transmitted and received over an existing IP-based communications network, such as the Internet. OpenADR version 2.0 (OpenADR 2.0) is a standard version of OpenADR that enables scaled deployments and interoperability within Smart Grid technologies, thus reducing the cost of DR technology enablement and customer adoption.

BRIEF DESCRIPTION OF THE DRAWINGS

The present disclosure will be more readily understood from the detailed description of embodiments presented below considered in conjunction with the attached drawings, of which.

It is to be understood that the attached drawings are for purposes of illustrating the concepts of the disclosure.

DETAILED DESCRIPTION

Implementations of the present disclosure are directed to an Open Automated Demand Response (OpenADR) server and related communications. In some implementations, the OpenADR server can deliver interoperable market signals to wholesale and retail clients and their energy management systems and devices via web services.

In one implementation, the system may comprise a server configured to receive, from an endpoint device, a message that represents an OpenADR-conformant message that may include a value indicating a level of energy consumption associated with the endpoint device. The server may optimize the energy usage at an endpoint device based on a current market energy price instead of based solely on energy consumption. In an example, the system can determine whether an energy consuming or producing device that is associated with the endpoint device should shed load (e.g., reduce operations) based on the current market energy price. The energy consuming or producing device may include, but is not limited to, an air conditioning (AC) unit, a heating unit, a lighting system, a generator, and the like.

In one implementation, the system may determine a block and index optimization and a demand charge avoidance. The system may continually monitor both the current price of energy and real-time energy consumption. Peak demand charges are incurred when customers and consumers of energy exceed a consumption threshold. By shedding load when the customer nears their historical peak, the system may prevent these charges. Block and index optimization may be performed in a similar fashion. Blocks are defined as a total amount of energy, and index is defined as the current real-time energy price. If the system determines that a customer may exceed their block, the system may consult the current index price. If the price is above the threshold level, the system may implement a load shed based on the available shed amount, the time remaining in the block and the predicted overage.

Figure 1:
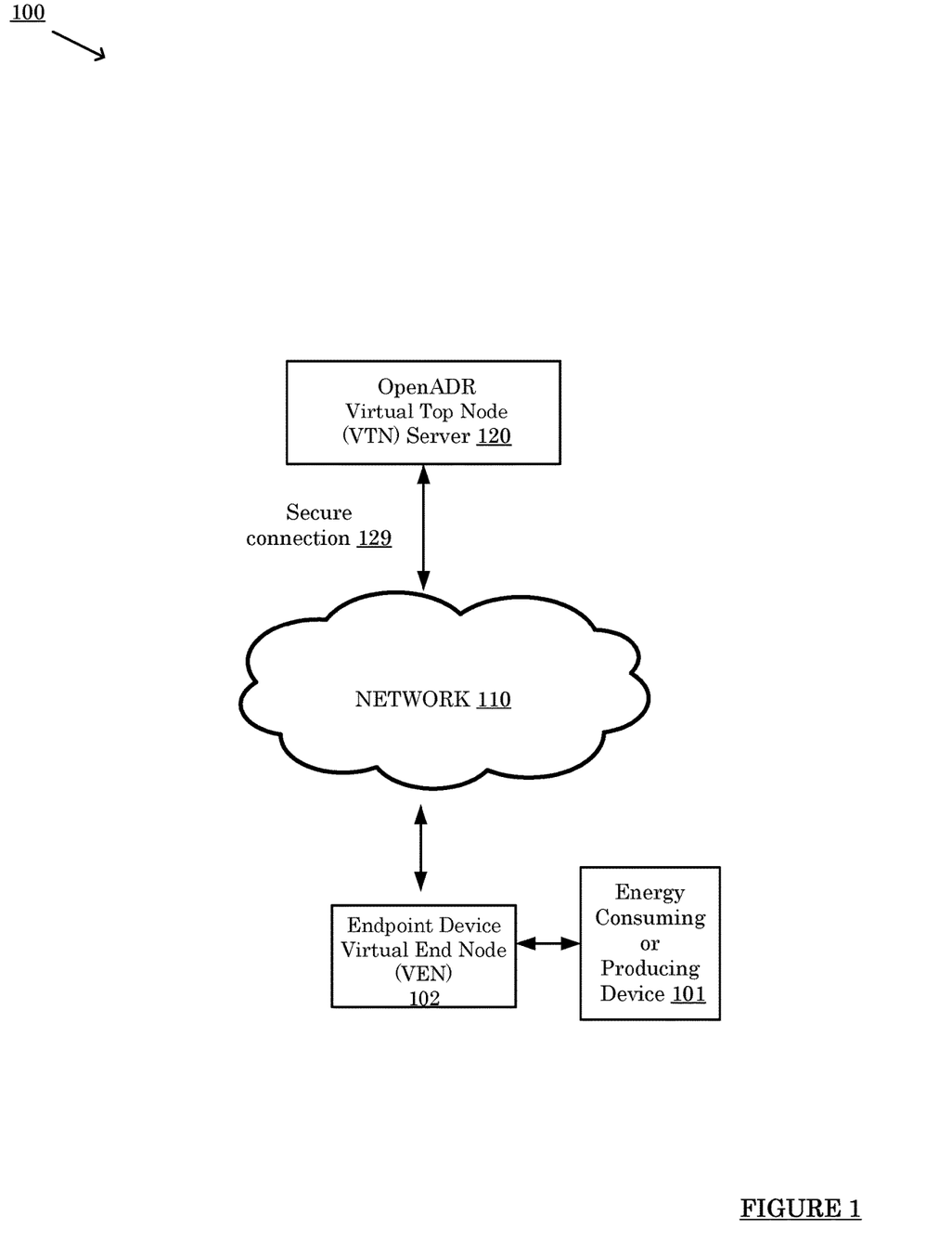
FIG. 1 is a block diagram of a system environment of Open Automated Demand Response (OpenADR) VTN server and related communications.

FIG. 1 is a block diagram of a networked environmental control system 100 of an OpenADR VTN server 202 and related communications in accordance with examples of the present disclosure. In one example, the endpoint device 102, which may also be referred to as a Virtual End Node (VEN), may be a device for managing and controlling an energy consuming or producing device 101. The energy consuming or producing device 101 may be any system or device that consumes energy, for example, a heating, ventilation, and air conditioning (HVAC) system, a lighting system, and the like. The endpoint device 102 may be directly integrated with the energy consuming or producing device 101 or may be separate from, but communicatively coupled to, the energy consuming or producing device 101. The endpoint device 102 may include inputs (e.g., digital and analog inputs and outputs or dry contacts) that measure or receive a variable (e.g., temperature, humidity, or pressure) and may include outputs to control the energy consuming or producing system.

In an example, the endpoint device 102 may include a processor or a processing device that may process and facilitate sending, receiving, playing, and displaying messages that communicate OpenADR-based messages. As used herein, the term "processor" or a "processing device" is intended to include, but is not limited to, a programmable electronic machine that performs executes software to perform several operations such as assemble, store, correlate, or otherwise processes information.

The networked environmental control system 100 may further include a network 110, which may be a local area network (LAN) or a wide area network (WAN) and/or may be a combination of one or more networks (e.g., the Internet, or a wired or wireless telephone network). In one example, the networked environmental control system 100 includes any type of communications medium that permits messages to be communicated to and from the endpoint device 102.

Networked environmental control system 100 may also include an OpenADR Virtual Top Node (VTN) server 120. In an example, the VTN server 120 may be any computing device that runs one or more services associated with the endpoint device 102. Examples of services include, but are not limited to, providing access to endpoint device 102 data, provisioning new endpoint devices 102, and providing administrative functions associated with the endpoint device 102 to an OpenADR-conformant node associated with the endpoint device 102.

The VTN server 120 may be configured to communicatively connect to the endpoint device 102 via network 110. The VTN server 120 may include any transmitter and receiver components that are capable of communicating with the network 110. In an example, the endpoint device 102 may be configured to communicatively connect to the VTN server 120 via network 110. The endpoint device 102 may include any transmitter and receiver components that are capable of communicating with the network 110. The VTN server 120 may be configured to communicatively connect to the network 110 via a secure connection 129. The secure connection 129 may be, but is not limited to, an internet connection made secure by provision of firewall security to prevent hackers, snoopers or spam-mail senders, or via encryption of messages, typically used for a virtual private network (VPN). In an example, the VTN server 120 communicates with the network 110 via a wireless connection using network protocols and a communications protocol module such as, for example, a communications protocol module for code division multiple access (CDMA) and for global system for mobile (GSM). In an example, the VTN server 120 may support, via a web portal (not shown) associated with the VTN server 120, event notifications, preschedule controls, and opt in/out status. As used herein, a web portal may refer to a specially designed web page that brings information together from diverse sources in a uniform way. In an example of pre-schedule controls, the VTN server 120 may anticipate a temperature of a building going up. In response, the building may be cooled ahead of time. This event may be triggered in the VTN server 120 in one of two ways. A first way is called time of use, wherein a price of energy is different during certain times of the day than it is at other times of the day. For example, the price of energy may be less expensive in the morning and more expensive in the afternoon. Accordingly, the VTN server 120 may initiate precooling of the building. The second way is that if the VTN server 120 detects conditions that are producing the likelihood of a demand response event coming from a grid operator, the VTN server 120 may initiate actions to precool the building precool to anticipate this event. In both cases, the action is precooling. The things that trigger precooling are either an awareness of a higher price forthcoming or an indication that an event is going happen.

The VTN server 120 may support event notifications and opt-in/out by implementing standard OpenADR 2.0b profile specifications. In some examples, VTN server 120 may be capable of communicating via other protocols and specification, and is not limited to communications via OpenADR. The VTN server 120 may extend the capabilities of a certified server (e.g., a VTN) by presenting both notification and schedule data to users via a web portal. Event notifications can include future events. Once available on the VTN server 120, these future events may be used to send pre-schedule controls (e.g., pre-chilling of freezer spaces, pre-cooling of building spaces, etc.) to VENs 102. These pre-schedule controls may also be available for inspection by users through the web portal (not shown) associated with the VTN server 120. Users of VTN server 120 may also subscribe to email and short message system (SMS) alerts of various system actions, including demand response (DR) events and pricing events.

In an example, the VTN server 120 may identify peak demand-causing behaviors, detect unplanned usage due to employee behaviors, and compare consumption among like facilities. These behaviors can make a significant impact in energy costs. Accordingly, the networked environmental control system 100 may detect these events and notify the operator so that changes in behavior can be implemented to reduce costs.

The networked environmental control system 100 may add a number of energy efficiency (EE) capabilities to the VTN server 120. For example, the VTN server 120 may collect telemetry data from meters and sub-meters in connection with the VEN 102 and energy consuming or producing devices 101 at a facility, and may array the meter data in a number of dashboard views. As used herein, telemetry refers to real-time consumption monitoring. Telemetry may be employed for various functions, e.g., to prevent customers from hitting new high levels of energy consumption to minimize peak load demand charges, to determine when to return from load shed to prevent rebound charges, to minimize charges due to time of use price schedules or real time high prices, and to maximize block and index contract values.

By charting power consumption over time from one or more meters being sampled, the VTN server 120 may identify outlying observations that may represent equipment cycling on (or off) at inappropriate times. Likewise, the VTN server 120 may support inter-facility comparisons so that operators of the VTN server 120 may compare buildings thought to be similar in design to see if their "real world" behavior is also similar. A number of measures of correlation may be made available in the dashboard to further assist operators of the VTN server 120 in identifying buildings behaving in similar fashion.

In an example, the VTN server 120 may decrease the complexity of receiving messages from utility providers by implementing a standard protocol—e.g., OpenADR 2.0b—for the conveyance of energy market information. The focus on a standard for transmission and receipt of basic market signals may permit more development time (and implementation resources) to be used in leveraging market signals in ways that may be useful to facility managers, rather than spending time in multiple implementations of data transmission software (e.g., one for each utility).

In one implementation, the VTN server 120 may permit a pricing signal to be mapped to an endpoint device and may direct updates to the endpoint device when the data changes. The networked environmental control system 100 may support OpenADR 2.0b enhanced Energy Interoperation event (EiEvent) service objects for price conveyance. As used herein, an EiEvent service object refers to a software object that indicates the need for a system operating under the OpenADR 2.0b standard to responding to a servicing event or interrupt. Accordingly, price data may be transferred from the VTN server 120 to any VEN 102 or VEN resource. In an example, the system 100 may facilitate the conveyance of price data by permitting any VEN 102 or VEN resource to be associated with the price feed from the VTN server 120. These feeds may include current day and next day prices and can be used by an appropriately-programmed VEN or building management system (BMS) to respond to "real world" price events in real-time.

For example, if price thresholds are hit, load shed occurs, and next day pricing produces a signal to enable precooling. In an example, the VTN server 120 may look for a new high level. The VTN server 120 may keep track of the previous high level, and, if the VTN server 120 detects a new high level, the VTN server 120 generates an alert. The alert permits an end user to look at the data and determined that the new behavior should be controlled. In another implementation, similar facilities may be compared. For example, if one building has 50,000 square feet and another building has 100,000 square feet, but the prices of energy exceeds a proportion of twice as much energy consumed for the 100,000 square feet building as compared to the 50,000 square feet building, then this may be an indication that something unusual with respect to energy consumption is happening in the 100,000 square feet building. Accordingly, pricing may be normalized.

In a further implementation, employee behaviors may be compared. A behavior indicates that energy consumption has not dropped. In one example, normal energy consumption may be low at night. Accordingly, an average consumption per hour may be applied. If the networked environmental control system 100 detects a higher than normal consumption of energy per hour, the VTN server 120 may generate an alarm. This alarm may alert an operator or other user that a process has been left running at night (i.e., an alarm generated based on employee behavior).

In one implementation, the networked environmental control system 100 may permit operators to customize and configure program parameters at the VTN server 120 for one or more VENs 102 to optimize and minimize energy consumption. For example, parameters such as number of calls per season, minimum notification time, maximum duration, event type, scale, etc. associated with one or more VENs 102 and processible by the VTN 120, may be automatically entered into an event screen provided by the web portal associated with the VTN 120. When the maximum number of calls is exceeded associated with a subset of a plurality of VENs 102 associated with a building, the system 100 can be configured to display only the remaining VEN's 102 not included in the subset of the plurality of VENs associated with the building. These remaining VEN's 102 are VEN's 102 that were not previously called due to locational DR or had opted out of earlier events. This feature permits the maximum usage of a program's enrolled facility resources.

In some implementations, the pricing logic incorporated into a VTN server 120 of the networked environmental control system 100 can utilize the principals of hysteresis to determine when to shed load. Hysteresis is an engineering principal that includes the history of past inputs in addition to the current input to determine the output. The use of hysteresis may prevent rapid transitions back and forth around a set point. In an example, the pricing logic may include parameters such as shed price, delay off, mandatory time off, return price, and delay on. The use of non-zero values for delays and a gap between shed and return price may permit the VEN 102 to make deliberate shed and return decisions, thereby preventing damage to the controlled equipment.

In an example, the VENs 102 may enable facilities to participate in utility or other energy service provider (ESP) programs. However, customers may also want access to the same meter data being reported to the utility. This feature is not supported in the standard OpenADR 2.0 protocol. In an example, the VTN server 120 may be configured to allow facility mangers to access that telemetry information (e.g., meter data being reported to the utility) and can allow for monitoring and managing their operations through the same VEN 102 device, exceeding the specifications of the existing OpenADR 2.0b profile.

The VEN 102 devices may communicate in a highly secure manner as specified in the OpenADR 2.0b profile. The VEN 102 devices may periodically poll the VTN server 120 to exchange information about DR events, energy prices and telemetry data. In this very same secure manner, the VEN 102 devices may also communicate with the VTN server 120. In different examples, the networked environmental control system 100 may: (1) monitor status, restart hardware services, change VEN and VTN parameters and settings and update software remotely; (2) monitor energy usage via utility meter or sub meters per location; (3) view all locations from a single portal; and, (4) curtail consumption automatically due to high energy prices and energy provider program calls to avoid peak demand charges.

In one implementation, the networked environmental control system 100 may be a cloud-based VEN gateway with an application configured to incorporate Representational State Transfer (REST)/JavaScript Object Notation (JSON) based web services.

Figure 2:
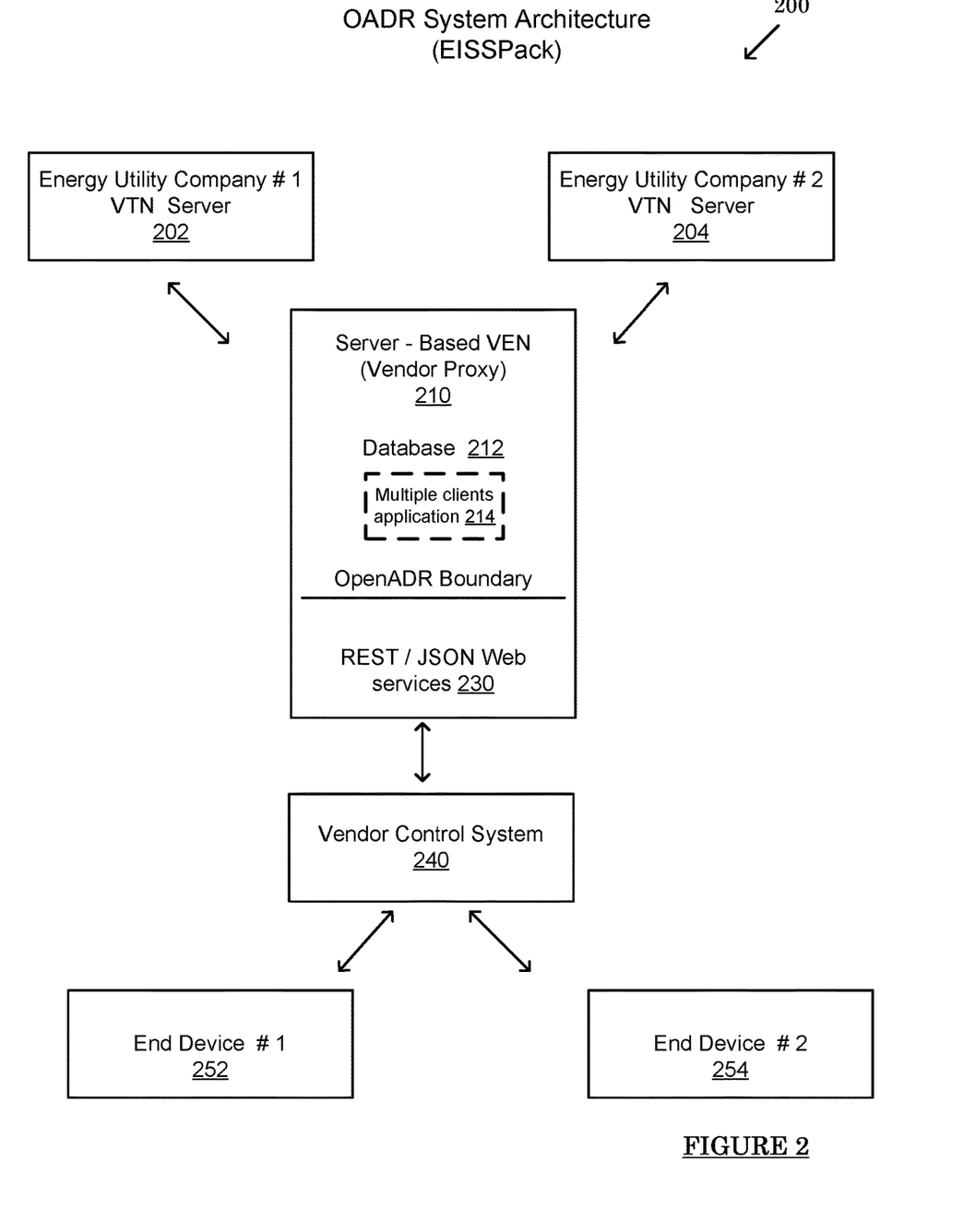
FIG. 2 is a block diagram of a system architecture for an OpenADR VTN server and related communications.

FIG. 2 is a block diagram of a system architecture 200 for an OpenADR system and related communications in accordance with examples of the present disclosure. The system architecture 200 may include a VTN server 202 that is located within energy utility company #1, a VTN server 204 that is located within energy utility company #2, a server-based VEN 210, a database 212, REST/JSON web services 230, a vendor control system 240, an end device #1 252, and an end device #2 254. VTN servers 202 and 204 are examples of OpenADR VTN server 120 of FIG. 1; server-based VEN 210 is an example of Endpoint Device VEN 102 of FIG. 1; end device #1 252, and end device #2 254 are examples of energy consuming or producing device 101 of FIG. 1.

The server-based VEN 210 may permit manufacturers to incorporate OpenADR 2.0 capabilities into their legacy control systems. The legacy control systems may include devices, such as the vendor control system 240, the end device #1 252, and the end device #2 254. In an example, the server-based VEN 210 may include an application (e.g., a multiple clients server application 214) that permits an existing cloud-based energy control platform to appear to be multiple OpenADR 2.0b clients (i.e., multiple VENs).

The server-based VEN 210 may also be referred to as a virtual VEN or a proxy VEN. The multiple clients server application 214 residing on the proxy VEN may provide an appropriate, secure response and Energy Interoperation report (EiReport) data back to the utility server (VTN servers 202 and 204) on behalf of cloud controlled devices.

The multiple clients server application 214 residing on the proxy VEN may communicate with the existing vendor's control system 240 via REST/JSON web services 230. This approach may enable the multiple clients server application 214 residing on the proxy VEN to be directly embedded in the vendor's cloud or in a remotely located cloud server.

OpenADR 2.0 may require end devices to be "stateful." This means that the device may be expected to maintain the status of the communicated items such as events, schedules, prior status, etc. Due to this requirement, the multiple clients server application 214 residing on the proxy VEN may maintain a trusted relationship between the utility server (VTN) and the vendor cloud system. Therefore, the multiple clients server application 214 residing on the proxy VEN may function as more than a protocol translation component. The multiple clients server application 214 residing on the proxy VEN may act as a facilitator to translate OpenADR 2.0b messages and maintain the state of events and opt status. The opt status is an indicator of whether an end device is participating in a DR event (i.e., "opt-in") or is not participating in a DR event (i.e., "opt-out").

The multiple clients server application 214 residing on the proxy VEN may also register with the upstream utility VTN servers (e.g., VTN servers 202 and 204), enable agreement on communication protocols between the VTN servers 202, 204 and the VEN 210, and permit security certificates to be exchanged. Downstream/customer applications may be notified when the utility sends either new or modified events, prices or set points. The start time/end time and other parameters may be communicated. The opt status of the end device may be reported. Reports (e.g., delivered via the EiReport web service), if requested, may be created and transmitted to the VTN servers 202 and 204 using the data provided by the vendor's existing cloud control system 240.

Representative uses of the system architecture 200 may include cloud-based applications such as thermostats, electric vehicles, power line carrier load control devices, and centrally networked enterprise building management systems.

When deployed as a telemetry solution, the server-based VEN 210 may transmit meter data over the Internet via the OpenADR 2.0b EiReport service to the VTN servers 202 and 204. The server 210 may: (1) store data and dynamically export the stored data to legacy systems, such as the vendor control system 240, the end device #1 252, and the end device #2 254; (2) vary telemetry sampling rates (e.g., one reading every four seconds or faster, with uploads of once per minute or faster to satisfy even the most demanding energy market requirements); (3) provide variable metering resolution, where the VEN may shift from low rate to high rate during demand response (DR) events. (Since the VEN "knows" when an event is coming, the VEN may modify its sampling rate appropriately to capture the "shoulders" of an event. (The VEN may deliver high resolution energy consumption details for the periods requiring them and less data outside event windows—thus avoiding the big (useless) data trap)); and, (4) provide automatic SMS text and email notifications for DR, market calls to perform, price threshold and block and index load sheds.

The system 200 may dynamically predict the amount of load shed available for a specified event. This parameter changes based on customer opt schedules and current consumption. The predicted amount of load shed may be tracked along with the actual load shed during the course of the event. VEN's may be automatically sorted by performance based on agreements and automatic notifications of inadequate load sheds. This capability permits the operator to adjust the program's conditions or to call additional programs to meet the required load shed.

Load shed predictions may be based on one or more commitments made by customers as part of the program enrollment process, including, but not limited to: (1) guaranteed load drop—a contractual commitment to curtail energy consumption by a certain amount; (2) firm service level—a contractual commitment to maintain energy consumption at or below a certain amount; (3) non-temperature dependent historical data—observational data based on a customer's historical energy use; and, (4) temperature dependent historical data—observational data based on a customer's historical energy use, normalized for temperature use.

Figure 3:
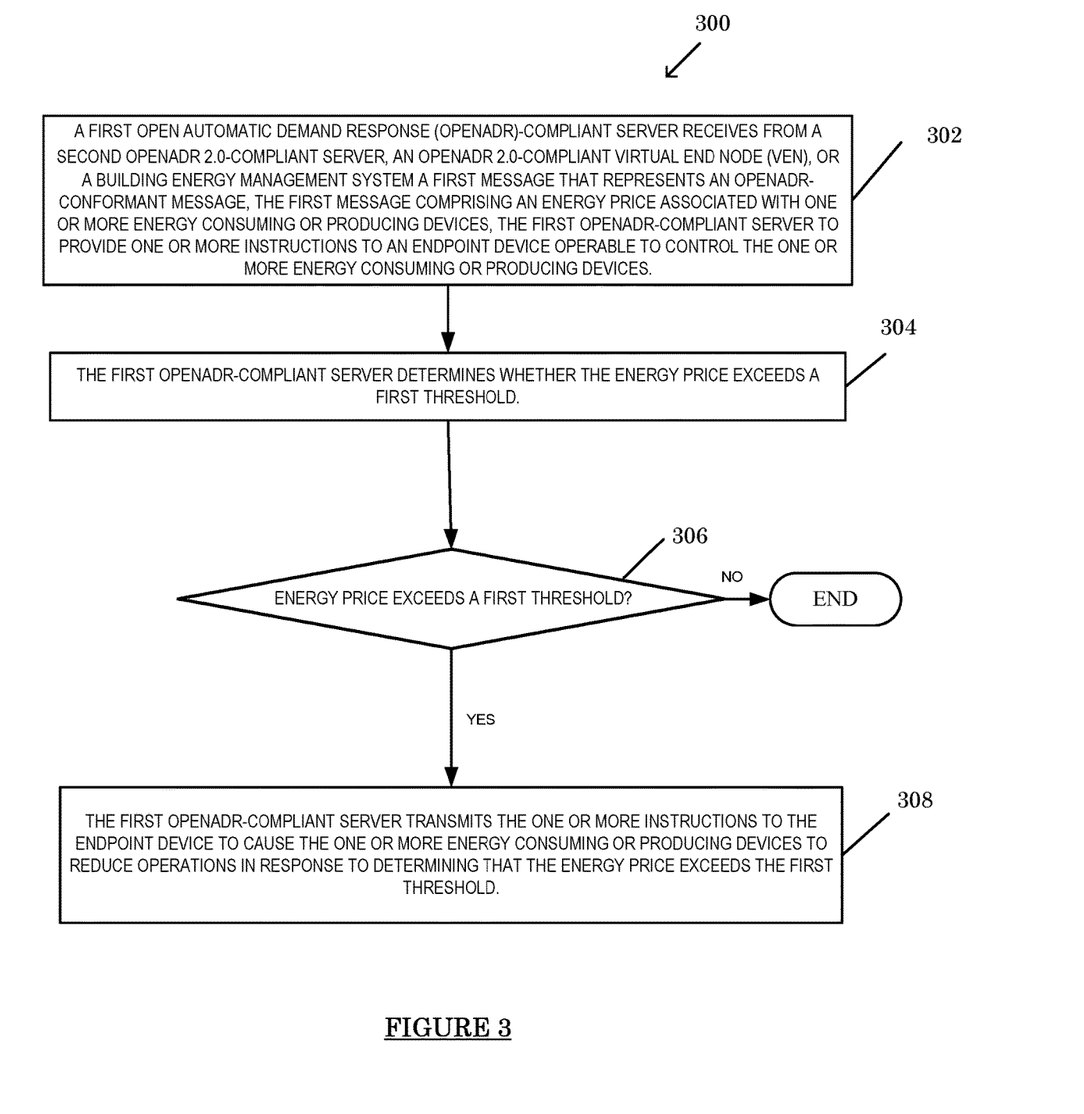
FIG. 3 is a flow diagram of a method for operating the VTN server when an energy price exceeds a first threshold.

FIG. 3 is a flow diagram of a method 300 for operating the VTN server 202 when an energy price exceeds a first threshold. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 may be performed by the VTN server 202 described with respect to FIG. 1.

Method 300 begins at block 302, where the VTN server 202 may receive from a second OpenADR 2.0-compliant server, an OpenADR 2.0-compliant virtual end node (VEN), or a building energy management system, a first message that represents an Open Automatic Demand Response (OpenADR)-conformant message. The first message may include an energy price associated with one or more energy consuming or producing devices. The VTN server 202 may provide one or more instructions to an endpoint device operable to control the one or more energy consuming or producing devices. At block 304, the VTN server 202 may determine whether the energy price exceeds a first threshold. At block 306, if the energy price exceeds the first threshold, then at block 308, the VTN server 202 may transmit the one or more instructions to the endpoint device to cause the one or more energy consuming or producing devices to reduce operations in response to determining that the energy price exceeds the first threshold. If, at block 306, the energy price does not exceed the first threshold, then the method terminates.

Figure 4:
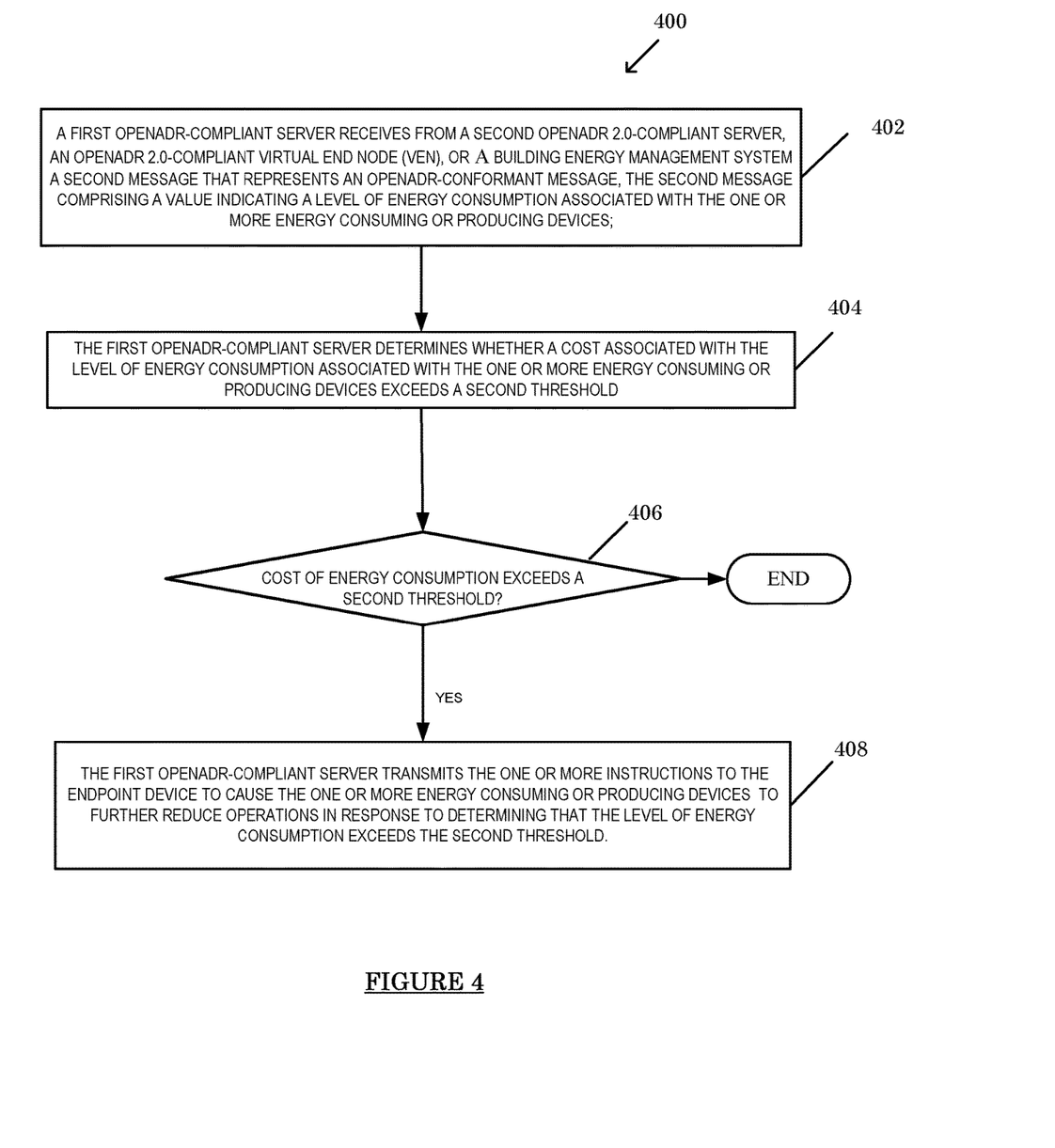
FIG. 4 is a flow diagram of a method for operating the VTN server when a cost associated with the level of energy consumption associated with the one or more energy consuming or producing devices exceeds a second threshold.

FIG. 4 is a flow diagram of a method 300 for operating the VTN server 202 when a cost associated with the level of energy consumption associated with the one or more energy consuming or producing devices exceeds a second threshold. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 may be performed by the VTN server 202 described with respect to FIG. 1.

Method 400 begins at block 402, where the VTN server 202 may receive from a second OpenADR 2.0-compliant server, an OpenADR 2.0-compliant virtual end node (VEN), or a building energy management system, a second message that represents an OpenADR-conformant message. The second message may comprise a value indicating a level of energy consumption associated with the one or more energy consuming or producing devices. At block 404, the VTN server 202 may determine whether a cost associated with the level of energy consumption associated with the one or more energy consuming or producing devices exceeds a second threshold. If, at block 406, the cost of energy consumption exceeds a second threshold, then at block 408, the VTN server 202 mat transmit the one or more instructions to the endpoint device to cause the one or more energy consuming or producing devices to further reduce operations in response to determining that the level of energy consumption exceeds the second threshold.

In an example, the level of energy consumption may be a cost of energy consumption that is greater than the second threshold.

In an example, the level of energy consumption is a block, the block comprising a total amount of energy, and an index is the current real-time energy price.

Figure 5:
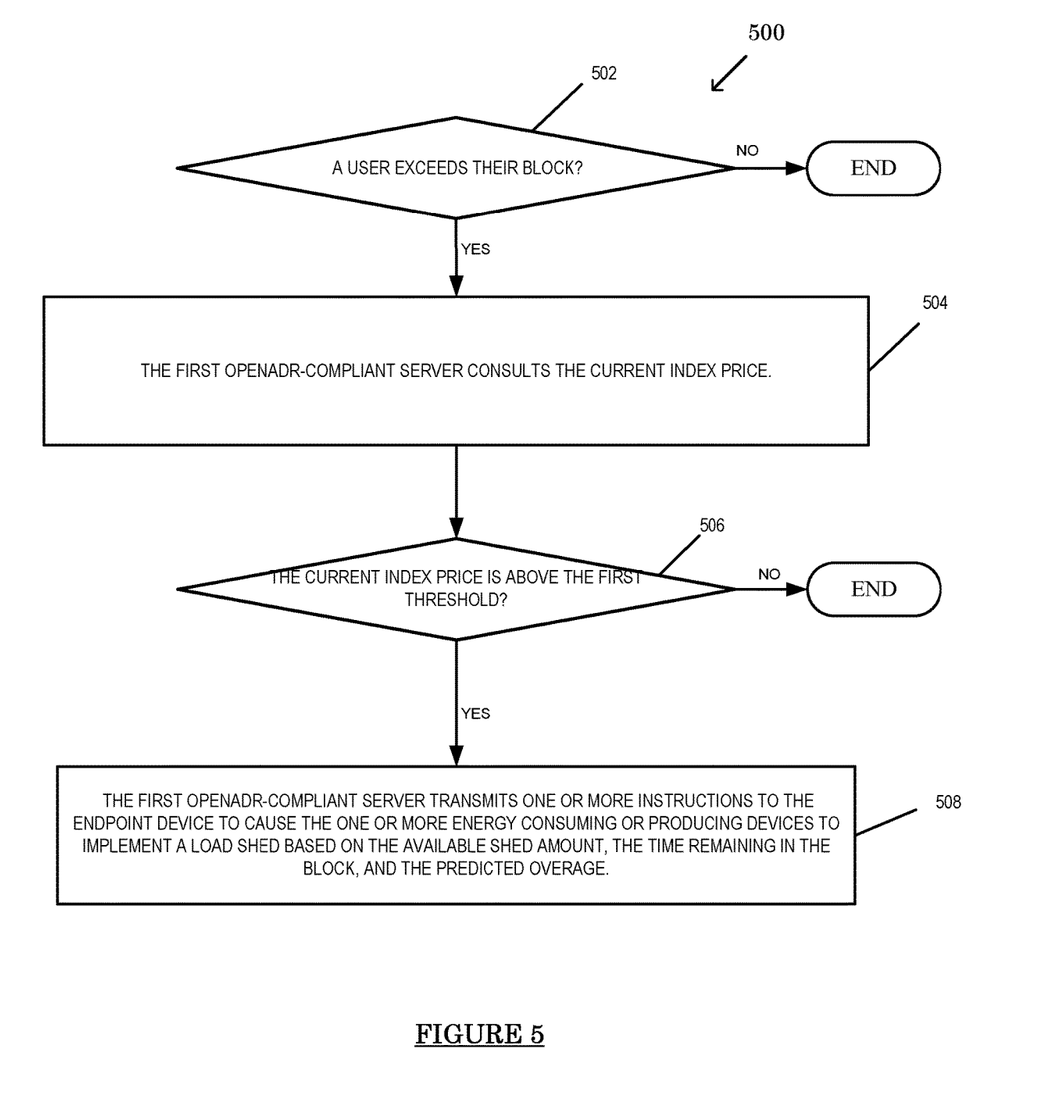
FIG. 5 is a flow diagram of a method for operating the VTN server when a user exceeds their allotted block.

FIG. 5 is a flow diagram of a method 500 for operating the VTN server 202 when a user exceeds their allotted block. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 may be performed by the VTN server 202 described with respect to FIG. 1.

Method 500 begins at block 502, where the VTN server 202 determines whether a user has exceeded their allotted block. If the user has exceeded their allotted block, then at block 504, the VTN server 202 may consult the current index price. If the user has not exceeded their allotted block, the method terminates. At block 506, the VTN server determines whether the current index price is above the first threshold. If the current price index is above the first threshold, then at block 508, the VTN server 202 may transmit one or more instructions to the endpoint device to cause the one or more energy consuming or producing devices to implement a load shed based on the available shed amount, the time remaining in the block, and the predicted overage.

In an example, the energy price may be the current real-time market energy price.

In an example, the VTN server may support at least one of event notifications, preschedule controls, or opt in/out status.

In an example, supporting prescheduling controls may include the VTN server anticipating a change in a temperature of a building and transmitting one or more instructions to the endpoint device to cause the one or more energy consuming or producing devices to adjusting the temperature of an associated building ahead of time.

In an example, the VTN server may anticipate a future event and transmit a prescheduling control to one or more virtual end nodes.

In an example, the VTN server may detect one or more behaviors comprising at least one of identifying peak demand-causing behaviors, detecting unplanned usage due to employee behaviors, or comparing consumption among like facilities.

In an example, in response to detecting the one or more behaviors, the VTN server may notify n an operator so that changes in behavior can be implemented to reduce costs.

Figure 6:
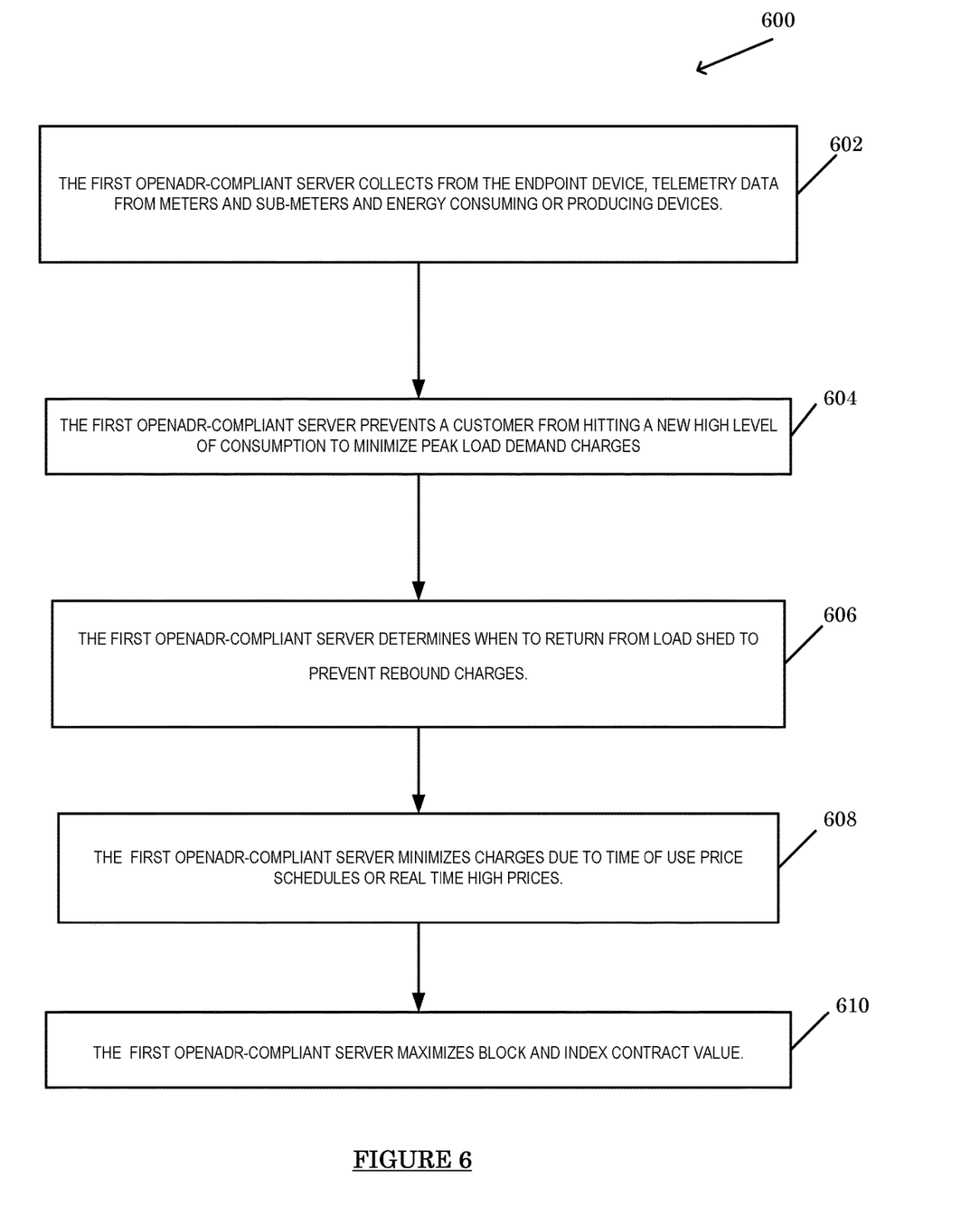
FIG. 6 is a flow diagram of a method for operating the VTN server when the VTN server collects telemetry data from an endpoint device.

FIG. 6 is a flow diagram of a method 600 for operating the VTN server 202 when the VTN server collects telemetry data from an endpoint device. Method 600 may be performed by processing logic that may comprise hardware (e.g., circuitry, dedicated logic, programmable logic, microcode, etc.), software (such as instructions run on a processing device), firmware, or a combination thereof. In one implementation, method 600 may be performed by the VTN server 202 described with respect to FIG. 1.

Method 600 begins at block 602, where the VTN server 202 may collect, from the endpoint device, telemetry data from meters and sub-meters and energy consuming or producing devices. At block 604, the VTN server may prevent a customer from hitting a new high level of consumption to minimize peak load demand charges. At block 606, the VTN server may determine when to return from load shed to prevent rebound charges. At block 608, the VTN server may minimize charges due to time of use price schedules or real time high prices. At block 610, the VTN server may maximize block and index contract value.

In an example, the VTN server may permit a pricing signal to be mapped to an endpoint device and direct updates to the endpoint device when data changes.

In an example, the VTN server may employ hysteresis in pricing logic to determine when to shed load.

In an example, the VTN server may dynamically predict the amount of load shed available for a specified event.

Figure 7:
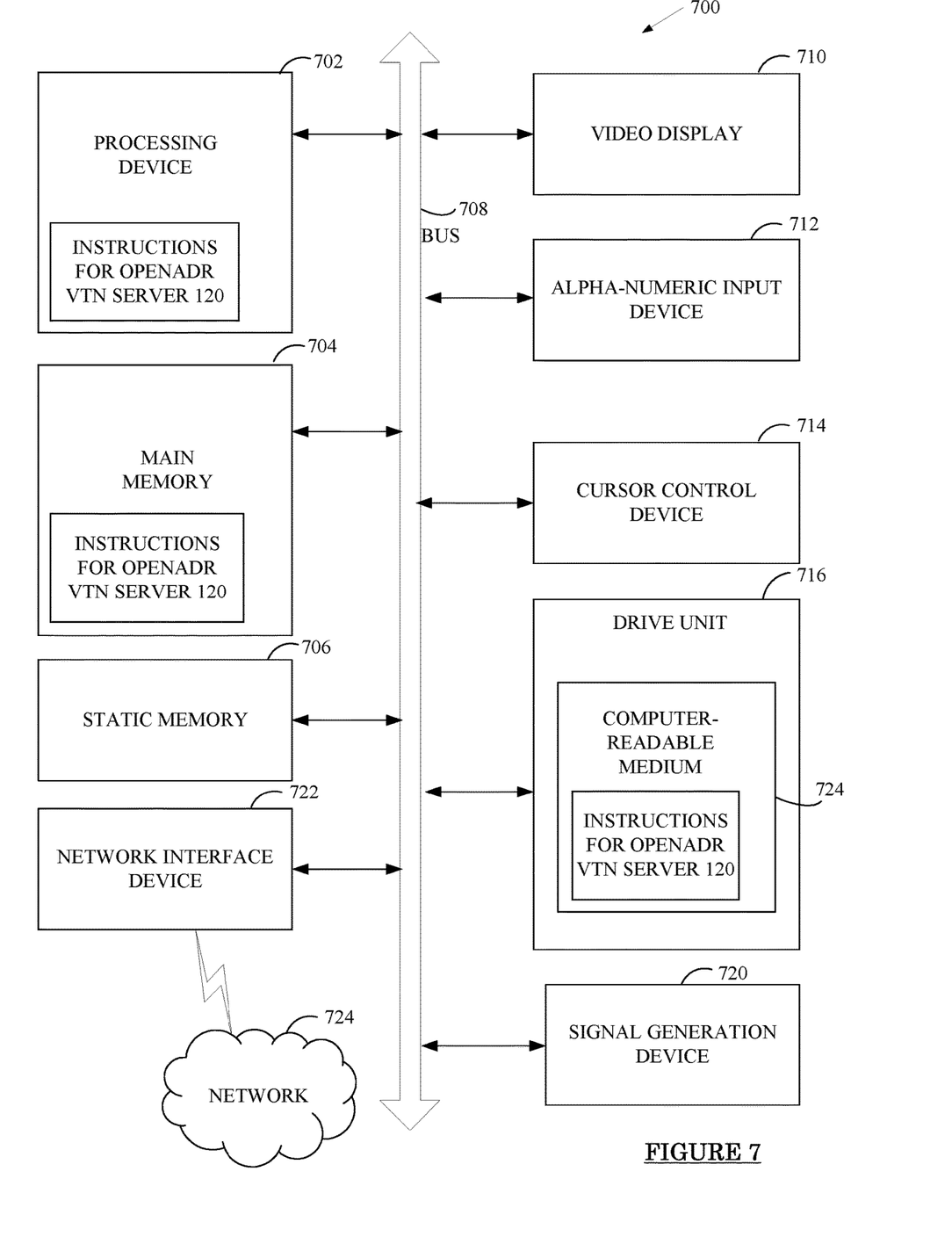
FIG. 7 is a block diagram of a computer system that may perform one or more of the operations described herein.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a processor, a microprocessor, a central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 702 is configured to execute instructions for performing the operations and steps discussed herein, illustrated in FIG. 7 by depicting instructions for the VTN server 120 within the processing device 702.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions (e.g., instructions for the VTN server 120) embodying any one or more of the methodologies or functions described herein. The instructions for the VTN server 120 may also reside, completely or at least partially, within the main memory 704 and/or within the processing device 702 during execution thereof by the computer system 700, the main memory 704 and the processing device 702 also constituting computer-readable storage media. The instructions for the VTN server 120 may further be transmitted or received over a network 110 via the network interface device 722.

While the computer-readable storage medium 724 is shown in an embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting", "receiving", "translating", "processing", "determining", and "executing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

receiving, by a first Open Automatic Demand Response (OpenADR)-compliant server from a second OpenADR 2.0-compliant server, an OpenADR 2.0-compliant virtual end node (VEN), or a building energy management system, a first message that represents an OpenADR-conformant message, the first message comprising a value indicating a level of energy consumption associated with one or more energy consuming or producing devices, the first OpenADR-compliant server to provide one or more instructions to an endpoint device operable to control the one or more energy consuming or producing devices, wherein the level of energy consumption comprises a block of energy allocated to the one or more energy consuming or producing devices, the block being representative of a total amount of energy available for consumption during a time period; and responsive to determining, by the first OpenADR-compliant server, that the energy consumption of the one or more energy consuming or producing devices during the time period has reached an associated historical consumption peak before the time period has ended, the historical consumption peak being based on historical energy use by the one or more energy consuming or producing devices:

consulting a current real-time market energy price index price; and responsive to determining that the current real-time market energy price is above a first threshold and responsive to a predicted energy-use overage in a remaining time of the block, transmitting, by the first OpenADR-compliant server, the one or more instructions to the endpoint device to cause the one or more energy consuming or producing devices to implement a load shed based on an available shed amount, wherein the first OpenADR-compliant server minimizes charges due to the current real-time market energy price.

2. The method of claim 1, further comprising:
receiving, by the first OpenADR-compliant server from the second OpenADR 2.0-compliant server, the OpenADR 2.0-compliant virtual end node (VEN), or the building energy management system, a second message that represents an OpenADR-conformant message, the second message comprising a value indicating an energy price associated with one or more energy consuming or producing devices;
responsive to determining, by the first OpenADR-compliant server, that the energy price exceeds a second threshold,
transmitting, by the first OpenADR-compliant server, the one or more instructions to the endpoint device to cause the one or more energy consuming or producing devices to further reduce operations in response to determining that the energy price exceeds the second threshold.

3. The method of claim 2, wherein the energy price is the current real-time market energy price.

4. The method of claim 1, further comprising supporting at least one of event notifications, preschedule controls, or opt in/out status.

5. The method of claim 4, wherein supporting prescheduling controls comprises:
anticipating a change in a temperature of a building; and
transmitting, by the first OpenADR-compliant server, one or more instructions to the endpoint device to cause the one or more energy consuming or producing devices to adjusting the temperature of an associated building ahead of time.

6. The method of claim 4, wherein supporting event notifications comprises:
anticipating a future event; and
transmitting, by the first OpenADR-compliant server, a prescheduling control to one or more virtual end nodes.

7. The method of claim 1, further comprising detecting one or more behaviors comprising at least one of identifying peak demand-causing behaviors, detecting unplanned usage due to employee behaviors, and comparing consumption among like facilities.

8. The method of claim 7, wherein, in response to detecting the one or more behaviors, notifying an operator so that changes in behavior can be implemented to reduce costs.

9. The method of claim 1, further comprising:
collecting, by the first OpenADR-compliant server from the endpoint device, telemetry data from meters and sub-meters and energy consuming or producing devices and implementing at least one of:
preventing a customer from hitting a new high level of consumption to minimize peak load demand charges,
determining when to return from the load shed to prevent rebound charges;
minimizing charges due to time of use price schedules or real time high prices; or
maximizing block and index contract value.

10. The method of claim 1, further comprising:
permitting a pricing signal to be mapped to an endpoint device; and
directing updates to the endpoint device when data changes.

11. The method of claim 1, further comprising employing hysteresis in pricing logic to determine when to shed load.

12. The method of claim 1, further comprising:
dynamically predicting the amount of load shed available for a specified event.

13. A system comprising:
a memory:
a processing device of a first Open Automatic Demand Response (OpenADR)-compliant server, operatively coupled to the memory to:
receive, from a second OpenADR 2.0-compliant server, an OpenADR 2.0-compliant virtual end node (VEN), or a building energy management system, a first message that represents an OpenADR-conformant message, the first message comprising a value indicating a level of energy consumption associated with one or more energy consuming or producing devices, the first OpenADR-compliant server to provide one or more instructions to an endpoint device operable to control the one or more energy consuming or producing devices, wherein the level of energy consumption comprises a block of energy allocated to the one or more energy consuming or producing devices, the block being representative of a total amount of energy available for consumption during a time period; and
responsive to determining that the energy consumption of the one or more energy consuming or producing devices during the time period has reached an associated historical consumption peak before the time period has ended, the historical consumption peak being based on historical energy use by the one or more energy consuming or producing devices:
consult a current real-time market energy price; and
responsive to determining that the current real-time market energy price is above a first threshold and responsive to a predicted energy-use overage in a remaining time of the block, transmit the one or more instructions to the endpoint device to cause the one or more energy consuming or producing devices to implement a load shed based on an available shed amount, wherein the first OpenADR-compliant server minimizes charges due to the current real-time market energy price.

14. The system of claim 13, wherein the processing device is further to:
receive a second message that represents an OpenADR-conformant message from the from the second OpenADR 2.0-compliant server, the OpenADR 2.0-compliant virtual end node (VEN), or the building energy management system, the second message comprising a value indicating an energy price associated with the one or more energy consuming or producing devices;
responsive to determining that the energy price exceeds a second threshold,
transmit the one or more instructions to the endpoint device to cause the one or more energy consuming or producing devices to further reduce operations in response to determining that the energy price exceeds the second threshold.

15. A non-transitory computer-readable medium storing instructions that when executed by a processing device of a first Open Automatic Demand Response (OpenADR)-compliant server, cause the processing device to:
receive, from a second OpenADR 2.0-compliant server, an OpenADR 2.0-compliant virtual end node (VEN), or a building energy management system, a first message that represents an OpenADR-conformant message, the first message comprising a value indicating a level of energy consumption associated with one or more energy consuming or producing devices, the first OpenADR-compliant server to provide one or more instructions to an endpoint device operable to control the one or more energy consuming or producing devices, wherein the level of energy consumption comprises a block of energy allocated to the one or more energy consuming or producing devices, the block being representative of a total amount of energy available for consumption during a time period; and
responsive to determining that the energy consumption of the one or more energy consuming or producing devices during the time period has reached an associated historical consumption peak before the time period has ended, the historical consumption peak being based on historical energy use by the one or more energy consuming or producing devices:
consult a current real-time market energy price; and
responsive to determining that the current real-time market energy price is above a first threshold and responsive to a predicted energy-use overage in a remaining time of the block, transmit the one or more instructions to the endpoint device to cause the one or more energy consuming or producing devices to implement a load shed based on an available shed amount, wherein the first OpenADR-compliant server minimizes charges due to the current real-time market energy price.

16. The non-transitory computer-readable medium of claim 15, wherein the processing device is further to:
receive a second message that represents an OpenADR-conformant message from the second OpenADR 2.0-compliant server, the OpenADR 2.0-compliant virtual end node (VEN), or the building energy management system, the second message comprising a value indicating an energy price associated with the one or more energy consuming or producing devices;
responsive to determining that the energy price exceeds a second threshold,
transmit the one or more instructions to the endpoint device to cause the one or more energy consuming or producing devices to further reduce operations in response to determining that the energy price exceeds the second threshold.

* * * * *